United States Patent [19]
Ioannilli et al.

[11] 3,773,004
[45] Nov. 20, 1973

[54] METHOD AND APPARATUS FOR POSITION DETECTING

[75] Inventors: Joseph R. Ioannilli, Beverly;
Ralph E. Karcher, Jr.; Abdullah A. Khambaty, both of Magnolia, all of Mass.

[73] Assignee: U.S.M. Corporation, Boston, Mass.

[22] Filed: Mar. 29, 1972

[21] Appl. No.: 239,109

[52] U.S. Cl. .................................. 112/262, 112/47
[51] Int. Cl. ........................ D05b 1/00, D05b 15/00
[58] Field of Search ....................... 112/47, 262, 35, 112/252; 12/20, 20.2, 8.3, 59.5

[56] References Cited
UNITED STATES PATENTS

| | | | |
|---|---|---|---|
| 3,561,027 | 2/1971 | Dunlap et al. | 12/8.3 |
| 2,512,436 | 6/1950 | Morrill | 112/35 |
| 2,550,611 | 4/1951 | Spaine | 112/252 |
| 3,337,212 | 8/1967 | Barker et al. | 112/47 |
| 3,661,106 | 5/1972 | Huddelston | 112/262 |

*Primary Examiner*—Patrick D. Lawson
*Attorney*—William R. Evans et al.

[57] ABSTRACT

A method and apparatus for detecting a particular position of a first member movable relative to a second member. In the method the first step is selecting a path of relative movement including the position followed by a second step of marking the first member at the position on the path with a mark having a different electrical property from the first member. The first member is then moved relative to the second along the path and the different electrical property of the mark detected for detecting the position. Apparatus for carrying out the method has means for selecting a path of relative movement between the members including the position and a mark having a different electrical property from the first member secured to the first member at the position. Means for moving the first member relative to the second member along the path are then activated at least until means for detecting the electrical property of the mark detect the mark at the position.

16 Claims, 5 Drawing Figures

METHOD AND APPARATUS FOR POSITION DETECTING

BACKGROUND OF THE INVENTION

Although the cost of general labor has increased in recent years, the cost of skilled labor has particularly increased. Skilled labor is an important factor in many industrial operations in which a first member is to be moved relative to a second member; manual skill is required to make the appropriate movement of the first member with sufficient rapidity and accuracy to be indutrially and economically practical. The rising cost of skilled labor has promoted a search for automatic equipment which will move a first member relative to a second member along a preselected path without skilled labor.

One such type of skilled labor which has become increasingly expensive to obtain is sewing machine operators. Therefore, automatic equipment to replace skilled sewing machine operators may be used as an example of similar efforts for other industrial operations.

Industrial sewing requires that a first member be moved relative to a second member, such as a workpiece being moved relative to stitch forming instrumentalities. The movement is along a preselected path in which stitches are to be formed with great rapidity, frequently at rates from 1,000 to 3,000 stitches per minute. Successful efforts have been made at guiding a workpiece along a selected stitching path; the results of one such effort are disclosed in United States Letters Pat. No. 3,080,836 issued Mar. 12, 1963, in the name of J. E. Clemens et al. The Clemens patent provides no means for detecting a particular position of the workpiece relative to a second member. As a result, an operator is required to initiate and terminate an operation on a machine equipped with such guidance mechanisms.

Productivity could be increased if an operator were not required to terminate the operation of such a machine. An operator could then start a series of machines without having to return to a machine in time to terminate its operation. Automatic termination would also further reduce the skill required of an operator who must otherwise skillfully assess the operation of the machine so as to appropriately terminate its operation. Where the speed of operation is high, as with industrial sewing machines, such assessment of machine operation is difficult.

Difficulties in appropriately terminating the operation of a machine are further increased where a sequence of operations must be performed immediately before or after termination of the machine operation. For example, in stitching a French cord binding about a periphery of a shoe part, termination of machine operation requires positioning the binding so that the end of the binding appropriately meets the beginning without undesirable overlaps, gaps, or misalignments. Such additional operations further increase required operator skill and time.

SUMMARY OF THE INVENTION

Accordingly it is an object of the invention to provide a method and apparatus for detecting a position of a first member relative to a second member as, for example, detecting a termination position for the application of a binding to a workpiece.

To this end the invention provides a method of detecting a position of a movable first member relative to a second member. A path of relative movement including the position is first selected. The first member is then marked at the position on the path with a mark having a different electrical property from the first member. The first member is then moved along the path relative to the second member, during which movement machine operations may be performed on one member by the other, at least until the differing electrical property of the mark is detected at the position.

Apparatus for carrying out the method has means for selecting a path of movement of a first member relative to a second member which includes a particular position. A mark having a different electrical property from the first member is secured to the first member at the position to mark the position. Means for moving the first member relative to the second member along the path are then activated at least until means for detecting the electrical property of the mark detect the mark at the position.

BRIEF DESCRIPTION OF THE DRAWINGS

The invention will now be described with reference to a preferred embodiment which is intended to be illustrative of and not a limitation on the type of apparatus which may be used to carry out the invention, drawings of which are.

DESCRIPTION OF THE PREFERRED EMBODIMENT

Figure 1:
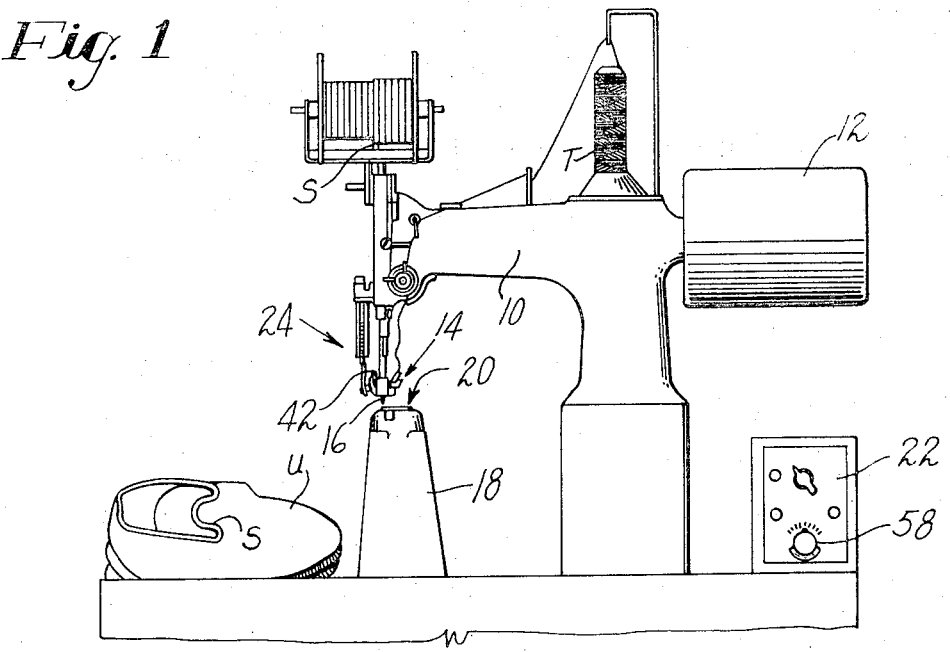
FIG. 1 is a front view of a known sewing machine for applying a French cord binding to a shoe upper.

A preferred embodiment of apparatus for carrying out a preferred form of the method is illustrated in FIG. 1 to be a single needle sewing machine of a well known raised hook post type adapted to sew a French cord binding S to a shoe upper U with thread T. The sewing maching has an electric motor 12 mechanically coupled to sewing instrumentalities generally at 14. A needle 16 of the sewing instrumentalities is effective to pass the thread T through a work piece placed on a raised hook post 18 enclosing some of the sewing instrumentalities.

A cover 20 of the hook post is provided with sensing units electrically connected to a control 22 and effective to select a path of movement of a first member, the workpiece U, relative to a second member, the hook post cover 20. Means generally at 24, are adapted to drivingly engage a workpiece on the hook post cover to move the workpiece along the selected path. The sensing unit control and means for moving the workpiece along the selected path are further described in the above mentioned Clemens patent.

Figure 3:
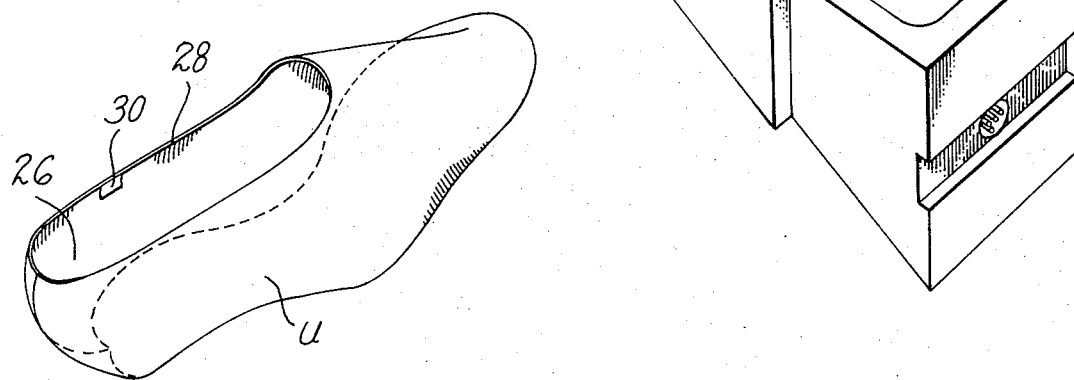
FIG. 3 is a perspective view of a workpiece with a mark.

As seen in FIG. 3, the first member, shown as shoe upper workpiece U, has a selected path of relative movement over a portion of a surface 26 of the workpiece adjacent the edge 28. A mark 30 having a different electrical property from the workpiece is secured to the surface 26 at a desired point along the selected path.

Figure 2:
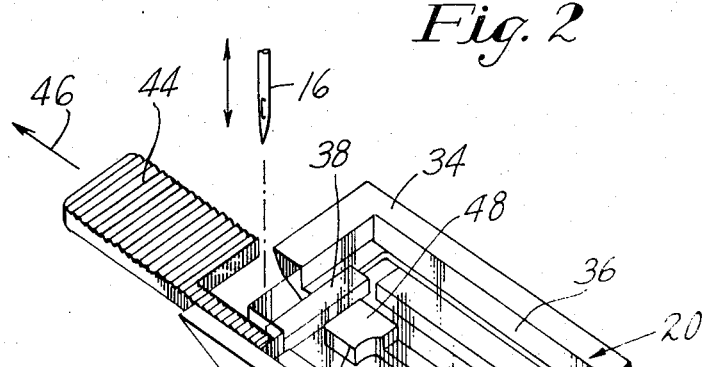
FIG. 2 is a perspective view showing portions of the hook post partially shown in the machine of FIG. 1.

Turning now to FIG. 2, a portion of a first probe 32 is seen to project through a portion of the hook post cover 20 shown as being transparent. The needle 16 constitutes a second probe which completes an electrical connection through the workpiece to the first probe 32 when it intermittently penetrates the workpiece to pass sewing thread through it. Both probes are positioned on the selected path of relative movement between the workpiece and the cover so that the mark eventually arrives at the probes which then complete an electrical circuit through the workpiece and the mark. The control is connected to the probes and effective to sense the different electrical property of the mark to detect that the first member workpiece and the second member cover are in the particular, marked position.

Returning to FIG. 3, the mark 30 is preferably a piece of metallic foil tape having a pressure sensitive adhesive on one side for securing the mark to the surface 26 of the workpiece. The foil tape is sufficiently thin and flexible that it may be left in place on a finished workpiece without interfering with its use as a shoe upper; typically the foil is a few thousandths of an inch thick. The foil tape mark may be secured to the workpiece by hand or may be secured by apparatus of the type described in copending United States Patent application Ser. No. 209,939 filed Dec. 20, 1971 in the name of J. Ioannilli. The foil tape has an electrical resistance, an electrical property, different from that of the exemplary shoe upper workpiece typically made from leather, cloth or thermoplastic materials, all of which have an electrical resistance much greater than that of a metallic foil. However, it should be understood that the invention is not limited to resistance as the electric property but may include such other properties as ionic conductance, high frequency conduction, capacitance or inductance.

Returning to FIG. 2 the hook post cover 20 has an outer lip portion 34 by which it is secured to the hook post. An aperture interior the lip receives a transparent plastic plug 36 in which are plotted photoelectric devices 38 and 40 and the first probe 32. The photoelectric devices are connected to the control 22 and are so placed as to be variably covered by the workpiece as it moves along the path of relative movement. The workpiece blocks the light received by the photoelectric devices from above the hook post cover to generate variable signals effective to cause the control to appropriately activate the means for moving the workpiece to maintain the workpiece on the selected path of movement relative to the cover 20. The moving means comprise a drive wheel 42, seen in FIG. 1, and feed dogs 44 having a workpiece engaging surface in a plane of the hook post cover. The feed dogs reciprocatingly engage a workpiece on the cover to drive the workpiece in the direction of arrow 46 while the wheel 42 steers the workpiece along the selected path, all as further described in the above mentioned Clemens patent.

The probe 32 has a surface portion 48 in the plane of the hook post cover and along the path of relative movement between the workpiece and the cover so as to engage the workpiece and the mark on the workpiece. The needle 16 is physically connected to the stitch forming instrumentalities for intermittent penetration of a workpiece on the hook post cover and electrically connected to ground. The electrical connection may be through the stitch forming instrumentalities so as to provide a safety feature by electrically grounding the stitch forming instrumentalities. The probe 32 is insulated from ground by the plug 36 in which it is mounted.

Figure 4:
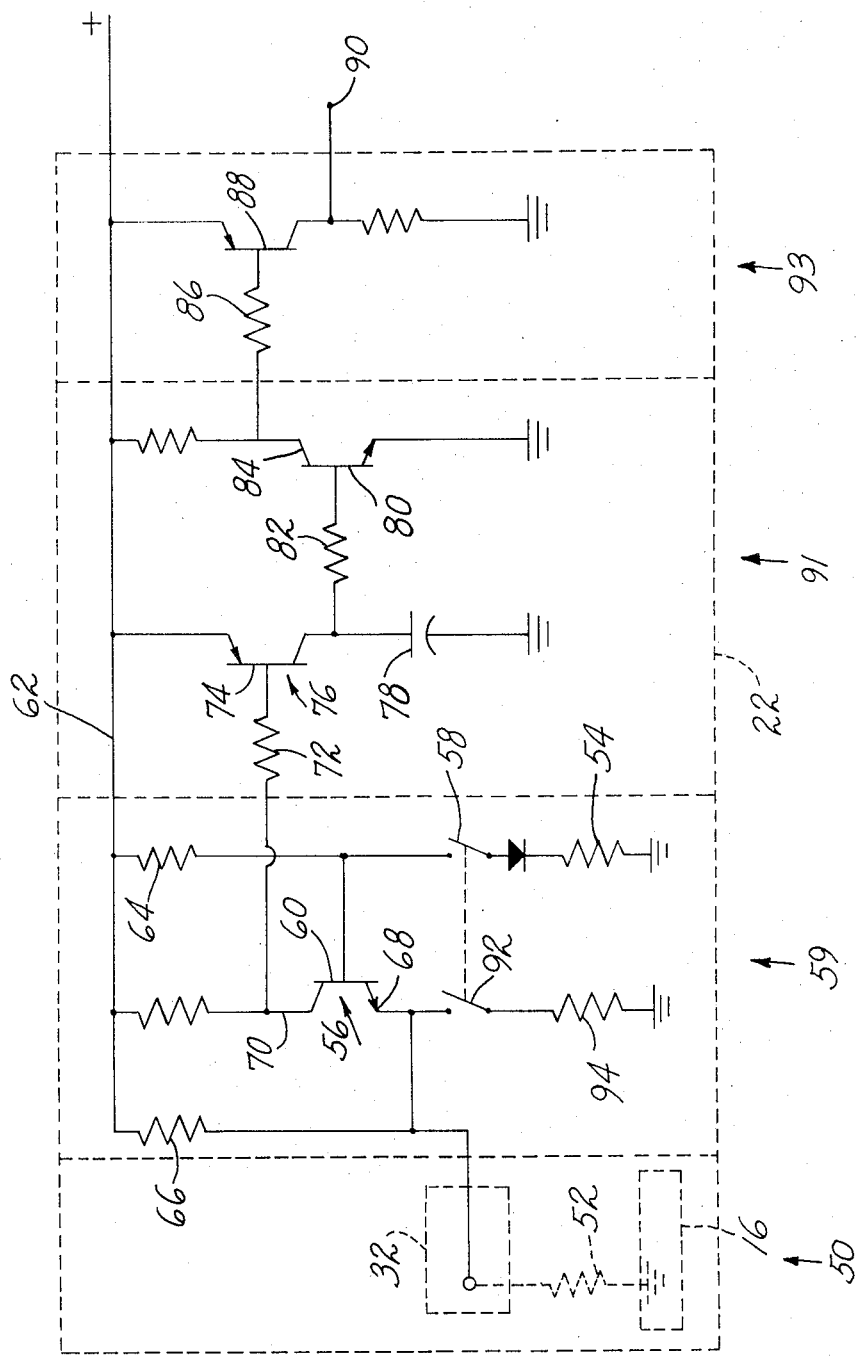
FIG. 4 is a schematic of a control circuit of the invention.

Sewing, intermittent movement of the needle intermittently completes an electrical circuit portion, generally at 50 in FIG. 4, to sample the resistance 52 of the workpiece or the workpiece and mark between the needle and first probe. When the needle penetrates only the workpiece, the resistance 52 is that of the workpiece but when the needle penetrates the workpiece and the mark, the resistance 52 is that of the workpiece and mark in parallel. Where the workpiece has a higher resistance, as when it is made of leather, than that of the mark, made, for example, of metal foil, the parallel resistance of the workpiece and mark is essentially that of the mark.

The control 22 comprises the remainder of the circuit shown in FIG. 4. The control compares the resistance 52 of the mark and/or workpiece with a resister 54 or the internal resistance of PNP type transistor 56 depending on the condition of switch 58. In other embodiments the switch 58 may have other poles connected to other resistances similarly to the resister 54 and may be sequentially connected to these poles to select various values of resistance 52 to which the control will be responsive. Accordingly, a section of the control with these elements may be called the resistance selection and comparison section 59.

When switch 58 is open the base 60 of the transistor 56 is connected to a source (not shown) of positive DC voltage by bus 62 and resister 64. Because switch 58 is open, no current flows through resister 54 and the voltage on bus 62 appears at the base 60 of transistor 56. A resister 66 connects the bus 62 with the resistance 52 and, in a potential dividing connection, with the emitter 68 of transistor 56. When the resistance 52 is much higher than that of resister 66 substantially all of the voltage on bus 62 will appear at the emitter of transistor 66 as at the base 60; thus, transistor 56 will not conduct. When the resistance 52 is much smaller than that of resister 66, the voltage at the emitter 68 will be much less than that on the base 60 and transistor 56 will conduct. When transistor 56 begins to conduct the voltage on a collector 70 of transistor 56 falls to that of the emitter 68 or essentially to ground since the resistance 52 is small.

The collector 70 of transistor 56 is connected through a current limiting resister 72 to the base 74 of an NPN type transistor 76. The drop in voltage on the base of transistor 76 causes current to flow from the bus 62 connected to an emitter of transistor 76 to the collector of transistor 76 connected to a capacitor 78 and a transistor 80 through current limiting resistor 82. The other side of capacitor 78 is connected to ground so that the capacitor is charged by current from transistor 76. The voltage through transistor 76 appears on the base of connected transistor 80 of the NPN type which then conducts current from the bus 62 connected to the collector of the transistor to the emitter, connected to ground.

The collector 84 of transistor 80 is connected by a current limiting resistor 86 to the base of a transistor 88 of the PNP type. When transistor 80 conducts the voltage on the collector 84 which appears on the base of the transistor 88 falls essentially to ground. Transistor 88 then conducts to provide a positive ongoing pulse at the output 90 of the control. The pulse at output 90 signals the detection of a mark by the probes in the circuit portion 50 of the sewing instrumentalities.

When the needle withdraws from the workpiece in its intermittent, sewing motion, the circuit portion 50 is opened and the resistance 52 seen by the control becomes very high. The voltage on the bus 62 then appears at the emitter 68 and base 60 of transistor 56 which then ceases to conduct. As transistor 56 ceases to conduct, the voltage at collector 70 increases to that of the bus 62 and appears at the base 74 of transistor 76 which also ceases to conduct. Capacitor 78 then discharges through current limiting resistor 82 to maintain transistor 80 in a conducting condition until the charge on the capacitor 78 is dissipated.

When transistor 80 ceases to conduct, its collector 84 increases to the voltage of bus 62 which appears at the base of transistor 88 as well as at its emitter so it also ceases to conduct. Transistor 80 and capacitor 78 thus serve to stretch the pulse appearing at the output 90 and may therefore be called a pulse stretching section 91 of the control.

It should be understood that transistor 88 serves as a pulse inverter to convert the negative ongoing pulse from transistor 80 to a positive ongoing pulse. Accordingly, it may be called the pulse inverter section 93 of the control. In another embodiment the negative ongoing pulse could serve to detect the presence or absence of a mark.

When switch 58 is closed, the operation of the control 22 is essentially the same as that described when the switch is open but the resistance 52 is now compared with that of resister 54. The voltage on the base 60 of transistor 56 is then that appearing on bus 62 divided by the resistance of resisters 64 and 54, while that appearing on the emitter 68 is that of the bus divided by the resistance of resisters 66 and 52 and 94 in parallel. When the workpiece resistance 52 is small, as when a mark appears between the probe 32 and needle probe 16, the resistance 52 will be small, permitting a substantially high positive voltage to appear from the emitter 68 to the base 60 of transistor 56. In order to prevent damage to the transistor from this positive emitter to base voltage, switch 58 is ganged with switch 92 to connect the emitter 68 of transistor 56 to ground through resister 94 when switch 58 is closed. The resister 94 has a relatively small resistance to maintain the voltage appearing at the emitter 68 at a relatively low level so as not to damage the transistor. Switch 58 thus permits the control to detect two different values of resistance 52.

The signal at output 90 is the detection of a low resistance 52 caused by the appearance of a mark between the probe 32 and the needle probe 16. The signal may perform any desired operation such as stopping the sewing instrumentalities of the machine of the preferred embodiment. Appropriate sequencing of operations immediately after detecting the mark permits several operations to be performed with only one mark. For this purpose, the mark is positioned where it is desired to start the first of the sequenced operations.

Figure 5:
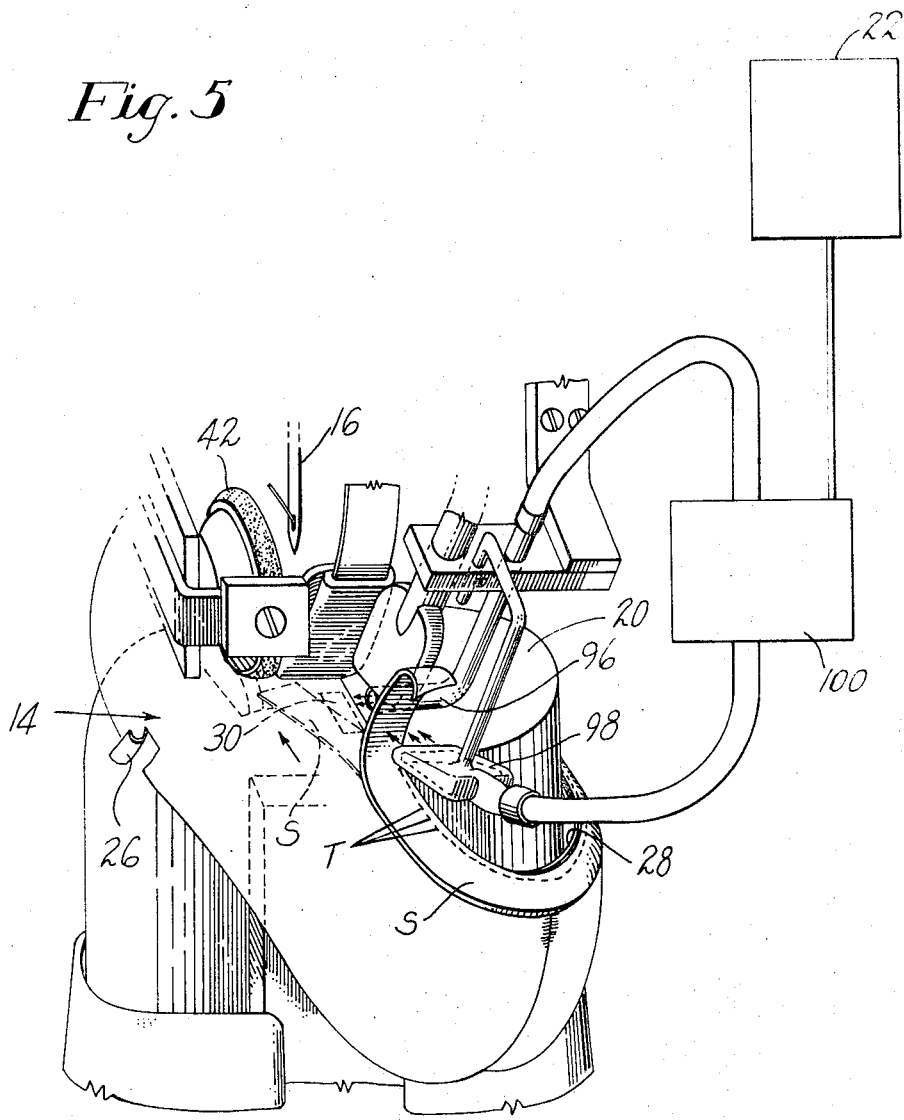
FIG. 5 is a perspective view of a portion of the machine shown in FIG. 1 with a workpiece near the end of an application of binding.

In order to appropriately terminate application of French cord described as the function of the preferred embodiment, the sewing instrumentalities include a pair of air nozzles 96 and 98 mounted on the machine above the hook post cover 20 and adjacent the needle 16 as best seen in FIG. 5. One nozzle 96 is directed parallel to the hook post cover 20; air from this nozzle blows an end of the binding first applied but not stitched to the workpiece away from the edge 28 of the workpiece to which the binding is sewn. The second nozzle 98 blows the binding downwardly toward the workpiece and hook post cover so that the end of the binding lies flat on the surface 26 of the workpiece to pass under a presser foot (not shown) of the sewing instrumentalities. The binding S is thus blown from a potential curled up position to the flat, aside position shown in phantom in FIG. 5.

Air for the nozzles 96 and 98 is supplied from a source 100 electrically operated by the control 22 to supply air to the nozzles when the control detects the marked position on the workpiece. When the nozzles are employed, the control 22 permits the machine to take a specified number of stitches after the mark is detected to complete the sewing operation with the air nozzles in operation. After the selected number of stitches the sewing operation is terminated.

It should be understood that in other embodiments of the invention the needle probe 16 need not intermittently move into engagement with the workpiece but may maintain a continual engagement as does the first probe 32 in the preferred embodiment. When the needle probe does intermittently move into engagement with the workpiece to sample the electrical property of the workpiece and mark, it is preferred that the mark be at least as long as the distance of workpiece movement between sampling engagement of the probe and workpiece so as to assure engagement of the probe with the mark.

Having thus described my invention what I claim as new and desire to secure by Letters Patent of the United States is:

1. A method of detecting a position of a first member movable relative to a second member, comprising the steps of: selecting a path of relative movement including the position; marking on the first member at the position a mark having a different electrical property from the first member; moving the first member relative from the other member along the path; and detecting the electrical property of the mark on the first member for detecting the position.

2. A method as in claim 1 wherein the electrical property of the mark is an electrical resistance of the mark different from that of the first member.

3. A method as in claim 1 wherein the step of marking comprises the step of attaching a mark to the first member.

4. A method as in claim 3 wherein the mark is metallic foil adhesively attached to the first member.

5. A method as in claim 1 wherein the step of detecting the electrical property comprises the steps of: engaging the first member and/or mark with a first and a second probe to complete an electrical circuit from one probe through the first member and/or mark to the other probe, and connecting the probes to a control for detecting the electrical property of the mark which differs from that of the first member.

6. A method as in claim 5 wherein the step of engaging the first member and/or mark with a probe comprises the step of moving one of the probes into and out of engagement with the member and/or mark to sample the electrical property of the member and/or mark.

7. Apparatus for detecting a position of a first member movable relative to a second member, comprising: means for selecting a path of movement of the first member relative to the the second member including the position; a mark having a different electrical property from the first member secured to the first member at the position; means for moving the first member relative to the second member along the path; and means for detecting the electrical property of the mark to detect the position.

8. Apparatus as in claim 7 wherein the mark is metallic foil secured to the first member.

9. Apparatus as in claim 7 wherein the electrical property is an electrical resistance and the means for detecting the electrical property comprise means for detecting the electrical resistance.

10. Apparatus as in claim 7 wherein the means for detecting the electrical property comprise a first and a second probe engaged with the first member and/or mark.

11. Apparatus as in claim 10 and additionally comprising means for intermittently engaging one of the probes with the first member and/or mark.

12. Apparatus as in claim 10 wherein the means for detecting the electrical resistance comprise: means for comparing a selected resistance with the resistance of the member between the probes, means for selecting the resistance to be compared with the resistance between the probes, and means for producing an electrical signal in response to certain sensed resistance values.

13. Apparatus as in claim 12 wherein the electrical signal is a pulse and additionally comprising means for stretching the pulse.

14. In a machine for applying a binding to a workpiece having means for moving the workpiece relative to the machine along a path on the workpiece, apparatus for signalling the termination of the application at a position on the path comprising: a mark having a different electrical property from the workpiece secured to the workpiece at the position, means for detecting the mark, and means for generating an electrical signal of termination in response to the detection.

15. Apparatus as in claim 14 and additionally comprising means responsive to the signal for moving a part of the binding first applied out of the way of the binding last applied.

16. Apparatus as in claim 15 wherein the means for moving the binding are air nozzles.

* * * * *

UNITED STATES PATENT OFFICE
CERTIFICATE OF CORRECTION

Patent No. 3,773,004　　　　　　　Dated November 20, 1973

Inventor(s) Joseph R. Ioannilli, Ralph E. Karcher, Jr., Abdullah A. Khambaty

It is certified that error appears in the above-identified patent and that said Letters Patent are hereby corrected as shown below:

In the listing of inventors, after Magnolia, add
--Salvatore R. Provanzano, East Boston,--

After Assignee: Change U.S.M. to --USM--

Signed and sealed this 30th day of July 1974.

(SEAL)
Attest:

McCOY M. GIBSON, JR.　　　　　　C. MARSHALL DANN
Attesting Officer　　　　　　　　Commissioner of Patents